(12) United States Patent
Nagaoka et al.

(10) Patent No.: US 7,797,927 B2
(45) Date of Patent: Sep. 21, 2010

(54) METHOD FOR CONTROL OF EXHAUST GAS PURIFICATION SYSTEM, AND EXHAUST GAS PURIFICATION SYSTEM

(75) Inventors: Daiji Nagaoka, Fujisawa (JP); Masashi Gabe, Fujisawa (JP); Takehito Imai, Fujisawa (JP); Shinji Hara, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 157 days.

(21) Appl. No.: 12/085,093

(22) PCT Filed: Sep. 20, 2006

(86) PCT No.: PCT/JP2006/318563

§ 371 (c)(1),
(2), (4) Date: May 15, 2008

(87) PCT Pub. No.: WO2007/060785

PCT Pub. Date: May 31, 2007

(65) Prior Publication Data

US 2009/0120069 A1 May 14, 2009

(30) Foreign Application Priority Data

Nov. 22, 2005 (JP) .............................. 2005-337241

(51) Int. Cl.
*F01N 3/00* (2006.01)

(52) U.S. Cl. .............................. 60/277; 60/276; 60/299; 60/285; 60/284

(58) Field of Classification Search ........... 60/276–277, 60/284–287, 299
See application file for complete search history.

(56) References Cited

U.S. PATENT DOCUMENTS 5,201,802 A * 4/1993 Hirota et al. ................... 60/276
5,842,341 A * 12/1998 Kibe ........................... 60/274
6,640,540 B2 * 11/2003 Sato et al. ..................... 60/297

FOREIGN PATENT DOCUMENTS

DE  103 00 555 A1  8/2003

(Continued)

OTHER PUBLICATIONS

International Search Report mailed Dec. 19, 2006 in connection with the International application PCT/JP2006/318563.

(Continued)

*Primary Examiner*—Thomas E Denion
*Assistant Examiner*—Jesse Bogue
(74) *Attorney, Agent, or Firm*—Staas & Halsey LLP

(57) ABSTRACT

The degree of a deterioration in catalyst is determined when the following requirements are satisfied: the operating state of an internal combustion engine (E) is in a predetermined operating state; and the temperature ($T1m$) of an exhaust gas, which flows into a catalyst (12), is in a second temperature range ($\Delta T80$) in which the upper limit of the second temperature range ($\Delta T80$) is 10% below the upper limit of a first temperature range ($\Delta T100$) between the activation start temperature (Ta) and the activation end temperature (Tb) of the catalyst (12) before a deterioration and the lower limit of the second temperature range ($\Delta T80$) is 10% above the lower limit of the first temperature range ($\Delta T100$). A deterioration index temperature (Tic) is regarded as a shift level of light-off characteristics of the catalyst (12) toward the higher temperature side, and the deterioration index temperature (Tic) is added to the reference determination temperature ($T0b$) before the deterioration, and the sum is used as the determination temperature (T0) for exhaust gas temperature raising control. According to the above constitution, the degree of deterioration of the catalyst (12) can be estimated without using a concentration sensor for an exhaust gas component such as an NOx concentration sensor with high accuracy, and the worsening of the state of the exhaust gas is suppressed while minimizing the worsening of the fuel consumption.

2 Claims, 3 Drawing Sheets

FOREIGN PATENT DOCUMENTS

| | | |
|---|---|---|
| JP | 8-312336 | 11/1996 |
| JP | 09-164320 | 6/1997 |
| JP | 10-159543 | 6/1998 |
| JP | 10-259714 | 9/1998 |
| JP | 11-270327 | 10/1999 |
| JP | 2003-214153 | 7/2003 |
| JP | 2004-324477 | 11/2004 |

OTHER PUBLICATIONS

Patent Abstracts of Japan, Publication No. 09-164320, Published Jun. 24, 1997.

Patent Abstracts of Japan, Publication No. 10-259714, Published Sep. 29, 1998.

* cited by examiner

| ΔT1 | ...... | ΔTi | ....... | ΔTn |
|---|---|---|---|---|
| Tent1 | ...... | Tenti | ....... | Tentn |

METHOD FOR CONTROL OF EXHAUST GAS PURIFICATION SYSTEM, AND EXHAUST GAS PURIFICATION SYSTEM

CROSS REFERENCE TO RELATED APPLICATIONS

This application claims the benefit under 35 U.S.C. Section 371, of PCT International Application Number PCT/JP2006/318563, filed Sep. 20, 2006 and Japanese Application No. 2005-337241 filed Nov. 22, 2005 in Japan, the contents of all of which are incorporated herein by reference.

BACKGROUND OF THE INVENTION

1. Field of the Invention

The present invention relates to a method for control of exhaust gas purification system in an exhaust gas purification system provided with a catalyst device supporting a catalyst for purifying an exhaust gas in an internal combustion engine and an exhaust gas purification system.

2. Description of the Related Art

There are various studies and proposals made on an exhaust gas purification device for purifying an exhaust gas in an internal combustion engine such as diesel engines and a part of gasoline engines have been made. Among them, there is an exhaust gas purification device in which a DPF (diesel particulate filter) or a NOx purification catalyst for purifying NOx (nitrogen oxides) is arranged. As the NOx purification catalyst, a three-way catalyst, an NOx occlusion/reduction catalyst, an SCR catalyst (selective contact catalyst) with urea addition, NOx direct reduction catalyst and the like are used. Also, arrangement of oxidation catalysts on the upstream side of the DPF or NOx purification catalyst is often employed.

In the oxidation catalyst, NOx purification catalyst and the like, a precious metal catalyst is used. With the oxidation catalyst, HC (hydrocarbon), CO (carbon monoxide) in the exhaust gas is oxidized by catalytic action of the precious metal catalyst.

With the NOx purification catalyst, using the catalytic action of the precious metal catalyst, in a rich air/fuel ratio with more fuel (thick air/fuel ratio) state, NOx is reduced to HC, CO, and three exhaust gas components of NOx, HC, CO are purified at the same time. On the other hand, in a lean air/fuel ratio (thin air/fuel ratio) with less fuel state, NO (nitrogen monoxide) is oxidized to $NO_2$ (nitrogen dioxide) and this $NO_2$ is occluded by an NOx occlusion material.

In an exhaust gas purification device in which an oxidation catalyst is arranged on the upstream side of an SCR catalyst, the oxidation catalyst promotes reaction from NO to $NO_2$ and reaction with $NH_3$ (ammonia) on the SCR catalyst.

The precious metal catalyst has the above important role. However, at a high temperature, a precious metal molecule is moved and its grain size is increased, which results in reduced total surface area and an area to which the exhaust gas component is adsorbed. Thus, such a phenomenon occurs that a low-temperature activity is particularly lowered. This phenomenon is called as sintering. If the sintering occurs in the oxidation catalyst, a temperature at which purification by the catalyst starts, in other words, a temperature at which HC, CO purification rates start to function (catalyst light-off temperature) is raised, while a catalyst light-off performance is deteriorated. Thus, the catalyst activity at a low temperature is worsened, the purification rate of the exhaust gas is lowered, and a state of the exhaust gas emitted to the atmosphere is deteriorated.

In the case of the NOx purification catalyst, when the sintering occurs, at a low temperature and in a rich air/fuel ratio state, a three-way purification rate of the three-way catalyst and the NOx occlusion/reduction catalyst at a low temperature is lowered, while in the lean air/fuel ratio state, reaction from NO to $NO_2$ is not promoted but NOx activity is lowered, and the occlusion capacity of the NOx occlusion/reduction catalyst is deteriorated. Thus, the NOx purification rate is lowered.

In the case of combination of the oxidation catalyst on the upstream side and the exhaust gas purification device such as the DPF, if the sintering occurs, oxidation of HC, CO, NO in the oxidation catalyst is not promoted at a low temperature and the temperature of the exhaust gas flowing into the exhaust gas purification device through the oxidation catalyst is not raised any more. As a result, if the exhaust gas purification device is a DPF, PM is easily collected, while if the exhaust gas purification device is a NOx occlusion/reduction catalyst, the temperature of the flow-in exhaust gas can not be fully raised by regenerative control and desulphurization control.

Moreover, in the case of combination of the oxidation catalyst on the upstream side and the SCR catalyst, when the sintering occurs, activity from NO to $NO_2$ in the oxidation catalyst is lowered at a low temperature, which deteriorates the NOx purification rate.

In the PM regenerative control for burning and removing PM collected by the DPF, NOx regenerative control for restoring NOx occlusion capacity of the NOx occlusion/reduction catalyst, desulphurization control for restoring sulfur poisoning of the NOx purification catalyst or the like, temperature raising of the exhaust gas by supplying HC, CO into the exhaust gas by post injection or the like and by oxidizing this by an oxidization catalyst arranged on the upstream side is widely carried out. At this temperature raising of the exhaust gas, the oxidation capacity of the HC, CO at a low temperature in the oxidation catalyst on the upstream side is also lowered. Therefore, a flow-out amount of the supplied HC, CO to the downstream side of the exhaust gas purification device might be increased, or PM regeneration, NOx regeneration, desulphurization or the like might be insufficient.

On the other hand, if the temperature raising control of the exhaust gas is executed by setting a value of a temperature for determination used in the temperature raising control high in advance, taking into consideration of the sintering, costs might be deteriorated by temperature rise more than necessary, or the sintering might be accelerated by the exhaust gas whose temperature is raised more than necessary, which results in shorter life of the catalyst.

Therefore, it is important to detect or determine a deterioration state of the oxidation catalyst or the like. As a deterioration detecting method of the exhaust gas purification catalyst, a method of detecting a deterioration state of the exhaust gas purification catalyst as described in Japanese Patent Kokai No. H09-164320 is proposed by detecting a rise of the activation temperature of the catalyst, detecting a rise of the temperature of the exhaust gas required for activation of the catalyst, or by detecting if a difference between the temperature of the exhaust gas flowing into the catalyst and the temperature of the exhaust gas flowing out of the catalyst (or catalyst temperature) has reached a predetermined value or not.

As another deterioration degree determining method of NOx catalyst, an exhaust purification device for an internal combustion engine as described in Japanese Patent Kokai No. H10-259714 is proposed that in the NOx catalyst, while in a NOx purification temperature window, the deterioration of the NOx catalyst is determined from a change of the NOx purification rate at a time when HC supply concentration is increased in a short time during which the catalyst temperature is not changed.

This NOx purification rate is calculated by $\eta 1=(S1\cdot S2)/S1$, $\eta 2=(S1\cdot S3)/S1$ from an NOx concentration S1 at a catalyst-inlet gas calculated based on an output signal of an accelerator sensor and an engine speed sensor and an NOx concentration S2 (or S3) at a catalyst outlet detected by an output signal of an NOx sensor. A change amount of the NOx purification rate is calculated by $(\eta 2-\eta 1)$, which is compared with a deterioration determination value set in advance.

In any of the deterioration determinations, only determination on deterioration or not is made by comparing numeral values for determining deterioration such as temperature difference and change in the NOx purification rate with the deterioration determination value set in advance. The deterioration determination is an effective deterioration determination method since it plays an important role in determining timing of desulphurization control for restoring from sulfur poisoning of the catalyst or timing for replacement of the catalyst.

However, since majority of the deterioration of the catalyst is caused by thermal deterioration such as sintering and deterioration by sulfur poisoning, it develops gradually in many cases, and the PM regenerative control, NOx regenerative control, desulphurization control or the like in conformity with the gradually developing deterioration is particularly important from the viewpoint of fuel cost improvement. Thus, detection or determination of a degree by which the activation characteristics (light-off temperature) is shifted to a high-temperature side (deterioration degree) due to development of the catalyst deterioration is more important than whether or not the catalyst has been deteriorated or not. However, there is no proposal made on this point in the above deterioration determinations.

Moreover, with the former deterioration detecting method (Patent Document 1), the catalyst deterioration is checked using a temperature at which the catalyst activation is started as determination standards, but this temperature at which the catalyst activation is started is largely changed by catalyst spatial speed, supplied HC concentration, and catalyst temperature rise per unit, and there is a problem of poor deterioration determination accuracy. On the other hand, with the latter deterioration determination method (Patent Document 2), the NOx sensor has not been put into practical use yet for diesel engines at present, its reliability is low and costs are high, which are problems.

Patent Document 1: Japanese Patent Kokai No. H09-164320

Patent Document 2: Japanese Patent Kokai No. H10-259714 (page 6, the paragraph [0040] to page 7, the paragraph [0045])

SUMMARY OF THE INVENTION

The present invention was made in order to solve the above problems and has an object to provide a method for control of an exhaust gas purification system and an exhaust gas purification system which can estimate a deterioration degree of a catalyst with accuracy even without using a concentration sensor of an exhaust gas component such as an NOx concentration sensor and execute exhaust-gas temperature raising control and HC supply control to an exhaust gas for activation of the catalyst while correcting a temperature for determination of the exhaust gas temperature based on the catalyst deterioration degree and as a result, which can prevent deterioration of an exhaust gas state emitted into the atmosphere while minimizing deterioration of fuel cost.

The method for control of an exhaust gas purification system in order to achieve the above object is a method for control of an exhaust gas purification system provided with a catalyst device supporting a catalyst for purifying an exhaust gas in an internal combustion engine in which a deterioration degree of the catalyst is detected and exhaust-gas temperature raising control is executed according to a change in purification characteristics by the deterioration degree, characterized in that:

a relation between a first exhaust gas temperature for determination, which is a temperature of an exhaust gas flowing into the catalyst and a first temperature difference for determination as a difference between a second exhaust gas temperature for determination, which is a temperature of the exhaust gas flowing out of the catalyst, and the first exhaust gas temperature for determination before deterioration, is stored in advance as data for deterioration determination;

when an operating state of the internal combustion engine is in a predetermined operating state and a first measured exhaust gas temperature, which is a temperature of the exhaust gas flowing into the catalyst, is within a second temperature range whose vertical width is narrower by 10% each than a first temperature range between an activation start temperature and an activation end temperature before deterioration of the catalyst, the deterioration degree is determined;

the determination on deterioration degree is made by calculating a first exhaust gas temperature for determination at which the first temperature difference for determination becomes equal to a first measured temperature difference calculated as a difference between a second measured exhaust gas temperature, which is a temperature of the exhaust gas flowing out of the catalyst, and the first measured exhaust gas temperature corresponding to said first measured exhaust gas temperature at determination based on the deterioration determination data;

the calculated first exhaust gas temperature for determination is subtracted from the first measured exhaust gas temperature at determination to make the result as a deterioration index temperature; and when a control to raise or lower the temperature of the exhaust gas flowing into the catalyst is executed in order to activate the catalyst, a temperature obtained by adding the deterioration index temperature obtained at the determination of the deterioration degree to a reference determination temperature set with that before deterioration as a reference is used as a temperature for determining an exhaust gas temperature in the control to raise or lower the temperature of the exhaust gas.

The exhaust gas purification system in order to achieve the above object is an exhaust gas purification system provided with a catalyst device supporting a catalyst for purifying an exhaust gas in an internal combustion engine and control means which detects a deterioration degree of the catalyst and controls exhaust gas temperature rise according to a change in the purification characteristics by the deterioration degree, characterized in that:

the control means stores a relation between a first exhaust gas temperature for determination, which is a temperature of an exhaust gas flowing into the catalyst and a first temperature difference for determination as a difference between a second exhaust gas temperature for determination, which is a temperature of the exhaust gas flowing out of the catalyst, and the first exhaust gas temperature for determination before deterioration as data for deterioration determination in advance;

when an operating state of the internal combustion engine is in a predetermined operating state and a first measured exhaust gas temperature, which is a temperature of the exhaust gas flowing into the catalyst, is within a second temperature range whose vertical width is narrower by 10% each than a first temperature range between an activation start temperature and an activation end temperature before deterioration of the catalyst, the deterioration degree is determined;

the determination on deterioration degree is made by calculating a first exhaust gas temperature for determination at which the first temperature difference for determination becomes equal to a first measured temperature difference calculated as a difference between a second measured exhaust gas temperature, which is a temperature of the exhaust gas flowing out of the catalyst, and the first measured exhaust gas temperature corresponding to said first measured exhaust gas temperature at determination based on the deterioration determination data;

the calculated first exhaust gas temperature for determination is subtracted from the first measured exhaust gas temperature at determination to make the result as a deterioration index temperature; and when a control to raise or lower the temperature of the exhaust gas flowing into the catalyst in order to activate the catalyst, a temperature obtained by adding the deterioration index temperature obtained at the determination of the deterioration degree to a reference determination temperature set with that before deterioration as a reference is used as a temperature for determining an exhaust gas temperature in the control to raise or lower the temperature of the exhaust gas.

The deterioration determination data is a relation between a first exhaust gas temperature Tent for determination and the first temperature difference ΔT for determination (solid line A) before deterioration, in other words, the temperature in a new catalyst as shown in FIG. 3. This relation is acquired as follows. Under a condition where the engine operating state and the exhaust gas temperature are equal to those at the determination, by changing the temperature of the exhaust gas flowing into the catalyst (first exhaust gas temperature for determination) Tent, a temperature of the exhaust gas flowing out of the catalyst (second exhaust gas temperature for determination) Tout is measured. The first temperature difference ΔT for determination is acquired by subtracting the first exhaust gas temperature Tent for determination from the second exhaust gas temperature Tout for determination. This is the relation between the first exhaust gas temperature for determination Tent and the first temperature difference ΔT for determination at this time. This deterioration determination data is stored in control means in advance by map data, functions or the like as exemplified in FIG. 4. If the deterioration determination data is changed by the engine operating state or exhaust gas temperature though under the determining condition, map data with the engine operating state or exhaust gas temperature is prepared as a parameter.

This predetermined operating state refers to an operating state where the HC and CO amounts in the exhaust gas are constant. By making deterioration degree determination when the operating state of the internal combustion engine is in this predetermined operating state, change of the NOx purification rate by the change in the HC concentration supplied to the catalyst is avoided. By this operation, catalyst deterioration under the stable condition with a constant HC supply amount can be confirmed.

If it is in the predetermined operating state or not is determined by whether the engine speed and load of the internal combustion engine is within a range of combination of the preset engine speed or load nor not. Therefore, this determination can be made by referring to the engine speed and load (fuel flow-rate) values obtained from outputs of the detected engine speed, accelerator sensor and the like with predetermined map data.

And by making the deterioration degree determination when a temperature of the exhaust gas flowing into the catalyst (first measured exhaust gas temperature) $T1m$ is within a second temperature range $\Delta T80$ whose vertical width is narrower by 10% each than a first temperature range $\Delta T100$ between an activation start temperature Ta before deterioration of the catalyst (new product) and an activation end temperature Tb, accuracy of the deterioration degree determination can be improved.

That is, in the vicinity of the activation start temperature (Ta before deterioration), the accuracy is worsened since a rise of the purification rate (temperature rise) is captured. At the activation end temperature (Tb before deterioration), on the other hand, the accuracy is worsened since a temperature at which the purification rate converges is captured. Thus, they are avoided. Also, in the vicinity of the activation start temperature and the vicinity of the activation end temperature, the temperature raising temperature $\Delta T$ (=Tout−Tent) by the catalyst, that is, the change of the first measured temperature difference $\Delta Tm$ and the first temperature difference $\Delta Tc$ for determination is small, and accuracy of the deterioration index temperature Tic is also worsened.

On the other hand, if the second temperature range $\Delta T80$ for determining the deterioration degree is narrowed, progress of the deterioration degree can not be fully grasped. Thus, the range is set at 80% of the first temperature range $\Delta T100$. This range is acquired empirically.

In this method of determining deterioration degree, as shown in FIG. 3, a first exhaust gas temperature Tc for determination at which the first temperature difference $\Delta Tc$ for determination based on deterioration determination data A becomes equal to the first measured temperature difference $\Delta Tm$ corresponding to the first measured exhaust gas temperature $T1m$ at the determination is calculated. This calculated first exhaust gas temperature Tc for determination is subtracted from the first measured exhaust gas temperature $T1m$ at the determination to have the result as the deterioration index temperature Tic. From this deterioration index temperature Tic, the deterioration degree of the catalyst in which the HC activity and light off is deteriorated and the temperature is shifted to a high temperature side can be continuously detected or determined with accuracy.

In other words, if no catalyst is provided, there is little difference between temperatures of the temperature sensors before and after, but if a catalyst is provided in-between, the catalyst outlet temperature becomes higher when the light-off temperature is reached and after. However, if the catalyst begins to be deteriorated, the light-off temperature is shifted to the high-temperature side as indicated by a two-dot chain line B (the shape of B in FIG. 3 does not necessarily indicate a result of actual measurement but a solid line A is shifted and provisionally indicated for simplification). That is, a temperature at which the catalyst outlet temperature begins to rise, that is, the temperature at which the temperature raising temperature by the catalyst begins to become larger is shifted to the high-temperature side. Then, from the temperature difference in the temperature sensors between the inlet and the outlet of the catalyst, the deterioration degree of the light-off temperature of the catalyst is detected. That is, the deterioration of the catalyst is determined by watching the rising temperature of activation in the catalyst.

By measuring a correlation characteristic between the temperature (light-off temperature) Tent and the exhaust gas purification performance (purification rate) ΔT in advance as the solid line A in FIG. 3, the temperature rise width Tic required to obtain the same purification rate ΔT after the deterioration can be acquired from calculation.

And the deterioration index temperature Tic is added to a reference determination temperature set with the temperature before deterioration as a reference to have a determination temperature of the exhaust gas temperature and used for control to raise or lower the temperature of the exhaust gas. By this operation, without complicating an algorithm of temperature-raising control or temperature-lowering control, the deterioration degree of the catalyst can be reflected in the temperature-raising control or temperature-lowering control. Therefore, deterioration of fuel cost in the temperature-raising control or temperature-lowering control and discharge (slip) of HC, CO to the downstream side of the exhaust gas purification device can be restricted.

This temperature-raising control of the exhaust gas temperature includes temperature raising by additional injection in an expansion stroke in combustion (multistage injection) or means for throttling an exhaust gas flow-rate. However, they may be accompanied by deterioration in fuel cost. Thus, both in order to prevent increase in $CO_2$ emission and to restrict deterioration of the exhaust gas, this deterioration determination of the catalyst and correction of the determination temperature of the exhaust gas temperature are preferably carried out as appropriate. The temperature-lowering control is executed when occurrence of an abnormally high-temperature state of the catalyst is to be prevented or the temperature-raising control is to be ended or stopped.

Particularly, a vehicle for delivery service as its main operation mainly runs in a city with relatively few chances for the engine operating state or the first measured exhaust gas temperature to fall under the predetermined operating state or in the second temperature range. For this type of vehicles, when the engine operating state or the first measured exhaust gas temperature falls under the predetermined operating state or the second temperature range, respectively, it is preferably configured such that the catalyst deterioration determination and the correction of the determination temperature of the exhaust gas temperature are automatically executed.

As for catalysts, the present invention may be applied to oxidation catalysts, three-way catalysts, NOx occlusion/reduction catalysts, NOx direct reduction catalysts, SCR catalysts and the like. The determination temperature of the exhaust gas temperature of the present invention may be applied not only to PM regenerative control but to the determination temperature of the exhaust gas temperature for the temperature-raising control or the temperature-lowering control of the exhaust gas used in the NOx regenerative control, desulphurization control to restore from sulfur poisoning and the like.

According to the method for control of exhaust gas purification method and the exhaust gas purification system of the present invention, the continuous deterioration degree of the catalyst can be detected with accuracy as the deterioration index temperature only by monitoring the exhaust gas temperature before and after the catalyst. Moreover, by correcting the reference determination temperature by a portion of the deterioration index temperature and carrying out the exhaust gas temperature-raising control using it as the determination temperature at the exhaust gas temperature-raising control, deterioration of the exhaust gas state emitted to the atmosphere can be prevented while minimizing the deterioration of the fuel cost.

DETAILED DESCRIPTION OF THE EMBODIMENTS

A method for control of an exhaust gas purification system and the exhaust gas purification system are described below referring to the attached drawings using a case where an oxidation catalyst device is arranged on the upstream side and filter device with catalyst (DPF device) on the downstream side as an example.

Figure 1:
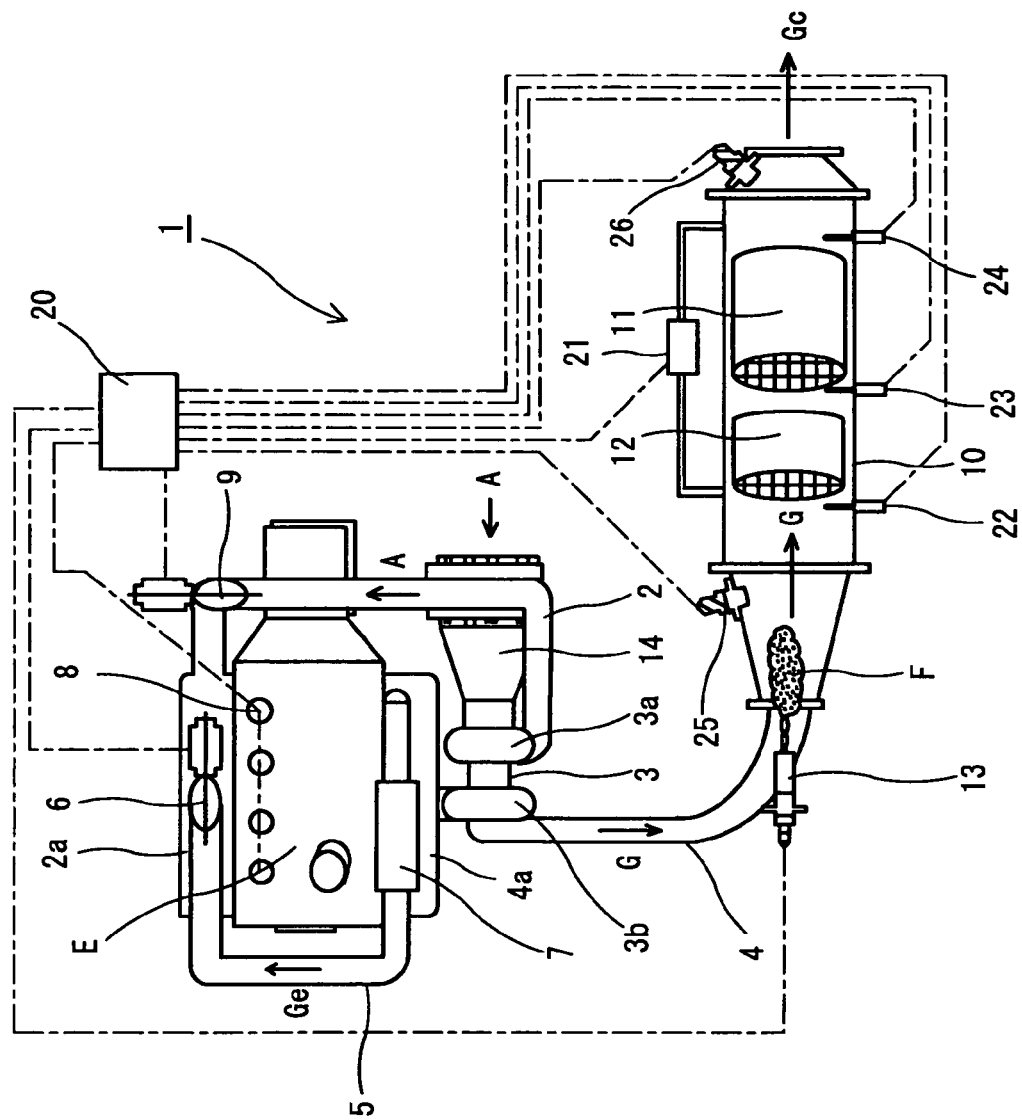
FIG. 1 is a diagram illustrating configuration of an exhaust gas purification system of an embodiment according to the present invention.

FIG. 1 shows a configuration of an exhaust gas purification system 1 in an exhaust passage 4 of a diesel internal combustion engine (engine) E, a turbine 3b of a turbo charger 3, an HC supply device 13, and an exhaust gas purification device 10 are arranged. The exhaust gas purification device 10 is one of continuous regenerative type DPF (diesel particulate filter) devices and includes an oxidation catalyst device 12 on the upstream side and a filter device 11 with catalyst on the downstream side.

The oxidation catalyst device 12 may be formed by having an oxidation catalyst such as platinum (Pt) or the like supported by a supporter in a honeycomb structure of porous ceramic or the like. The filter device 11 with catalyst may be formed by a monolith-honeycomb wall-flow type filter in which an inlet end and an outlet of a channel of a porous ceramic honeycomb are alternately sealed or a felt-state filter or the like in which an inorganic fiber such as alumina is laminated at random. A catalyst such as platinum, cerium oxide or the like is supported by this filter portion. If a monolith-honeycomb wall-flow type filter is employed for the filter device 11 with catalyst, PM (particulate matter) in an exhaust gas G is trapped by a porous ceramic wall, while if the fiber filter type is employed, the PM is trapped by the inorganic fiber in the filter.

The HC supply device 13 is used for supplying unburned HC such as fuel F into the exhaust gas when the exhaust gas temperature is low at the PM regenerative control of the filter device 11 with catalyst. This unburned HC is oxidized by the oxidation catalyst device 12, and the exhaust gas temperature is raised by its oxidation heat. By this operation, the PM trapped by flowing a high-temperature exhaust gas into the filter device 11 with catalyst is burned and removed. If the unburned HC is supplied into the exhaust gas by post injection in the in-cylinder fuel injection, the HC supply device 13 may be omitted.

In an intake passage 2, a mass air-flow sensor (MAF sensor) 14, a compressor 3a of the turbo charger 3, an intake throttle valve 9 and the like are provided. This intake throttle valve 9 adjusts an amount of intake A flowing into an intake manifold 2a. Also, an EGR passage 5 for re-circulating EGR gas Ge, which is a part of the exhaust gas, from an exhaust manifold 4a side to the intake manifold 2a is provided. At the EGR passage 5, an EGR cooler 7 and an EGR valve 6 are provided.

In order to estimate an accumulated amount of the PM in the filter device 11 with catalyst, a differential pressure sensor 21 is provided at a conduit connected before and after the exhaust gas purification device 10. For regenerative control of the filter device 11 with catalyst, an oxidation-catalyst inlet exhaust-temperature sensor 22 is provided on the upstream side of the oxidation catalyst device 12 and a catalyst outlet exhaust-temperature sensor 23 between the oxidation catalyst device 12 and the filter device 11 with catalyst, respectively. Moreover, on the downstream side of the filter device 11 with catalyst, a filter-outlet exhaust-temperature sensor 24 is provided.

This oxidation-catalyst inlet exhaust-temperature sensor 22 detects a first measured exhaust gas temperature T1m, which is a temperature of the exhaust gas flowing into the oxidation catalyst device 12. The catalyst-outlet exhaust-temperature sensor 23 detects a second measured exhaust gas temperature T2m, which is a temperature of the exhaust gas flowing out of the oxidation catalyst device 12. The second measured exhaust gas temperature T2m is a temperature of the exhaust gas flowing into the filter device 11 with catalyst. The filter-outlet exhaust-temperature sensor 24 monitors a burned state of the PM in the filter device 11 with catalyst so as to cope with runaway combustion of the PM, if any.

On the upstream side of the oxidation catalyst device 12 and on the downstream side of the filter device 11 with catalyst, λ sensors (air excess rate sensors) 25, 26 are arranged. The λ sensor 25 on the upstream side is for air/fuel ratio control when HC is supplied into the exhaust gas. The λ sensor 26 on the downstream side is to check that the PM in the filter device 11 with catalyst is burned and the PM regenerative control is carried out.

Output values of these sensors are inputted to a controller (ECU: Engine Control Unit) 20 for general control of operation of the engine E as well as regenerative control of the exhaust gas purification device 10. By a control signal outputted from the controller 20, the intake throttle valve 9, the fuel injection device (injection nozzle) 8, the EGR valve 6 and the like are controlled.

In this exhaust gas purification system 1, air A passes through an air cleaner (not shown), the mass air-flow sensor 14 of the intake passage 2, and the compressor 3a of the turbo charger 3. After that, the air A has its amount adjusted by the intake throttle valve 9 and enters a cylinder through the intake manifold 2a. The exhaust gas G generated in the cylinder goes out of the exhaust manifold 4a to the exhaust passage 4 and drives the turbine 3b of the turbo charger 3. Then, the exhaust gas G passes through the exhaust gas purification device 10 to become a purified exhaust gas Gc, passes through a silencer, not shown, and is discharged into the atmosphere. A part of the exhaust gas G passes through the EGR cooler 7 of the EGR passage 5 as the EGR gas Ge. After that, the EGR gas Ge has its amount adjusted by the EGR valve 6 and is re-circulated into the intake manifold 2a.

And a controller of the exhaust gas purification system 1 is incorporated in the controller 20 of the engine E and carries out control of the exhaust gas purification system 1 in parallel with the operation control of the engine E. The controller of the exhaust gas purification system 1 executes control of the exhaust gas purification system including determination of the catalyst deterioration degree of the oxidation catalyst device 12 and the PM regenerative control of the filter device 11 with catalyst.

Next, the exhaust gas temperature-raising control according to the detection (detection or determination) of the catalyst deterioration degree of the oxidation catalyst device (catalyst) 12 and change of the purification characteristics by the deterioration degree will be described.

Figures 3, 4:
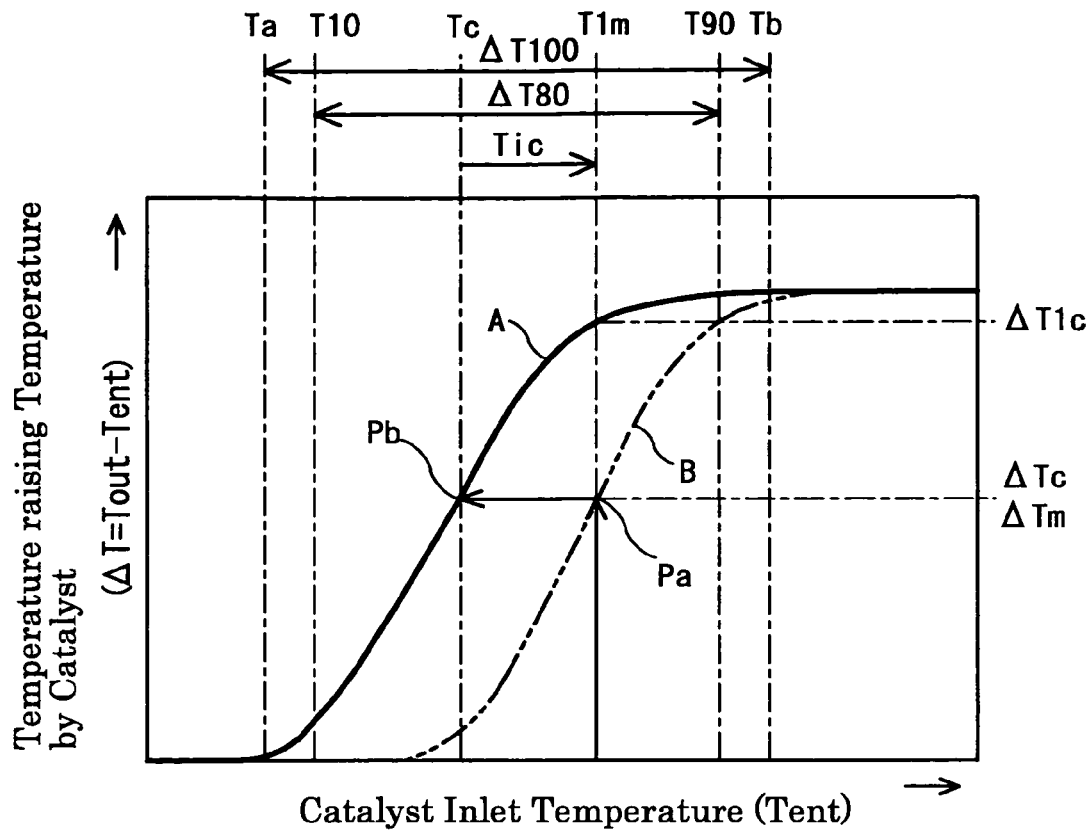
FIG. 3 is a diagram illustrating a relation between a catalyst inlet temperature and a temperature-raising temperature by the catalyst for explaining calculation of the deterioration index temperature according to the present invention.
FIG. 4 is a diagram illustrating an example of configuration of map data.

In this control, deterioration determination data (solid line A) as shown in FIG. 3 is prepared in advance and stored in the controller 20. The deterioration determination data is acquired as follows.

Before deterioration, in other words, in a new catalyst, by changing the temperature of the exhaust gas flowing into the oxidation catalyst device 12 (first exhaust gas temperature for determination) Tent under the condition that the engine operating state and exhaust gas temperature are the same as those at the determination, the temperature of the exhaust gas flowing out of the oxidation catalyst device 12 (second exhaust gas temperature for determination) Tout is measured. Using the measurement result, the first exhaust gas temperature Tent for determination is subtracted from the second exhaust gas temperature Tout for determination so as to acquire the first temperature difference ΔT (Tout−Tent) for determination. The relation between the first exhaust gas temperature for determination (catalyst inlet temperature) Tent and the first temperature difference for determination (temperature-raising temperature by catalyst) ΔT is the deterioration determination data (solid line A). The deterioration determination data is a map data (ΔT1~ΔTi~Tn: Tent1~Tenti~Tentn) as exemplified in FIG. 4, functions and the like and are stored in control means in advance.

Moreover, the activation start temperature Ta and the activation end temperature Tb of the oxidation catalyst device 12 before deterioration (new product) are acquired, and a lower limit value T10 and an upper limit value T90 of the second temperature range ΔT80 whose vertical width is narrower by 10% each than the first temperature range ΔT100 between the both Ta, Tb are calculated and stored in advance.

Figure 2:
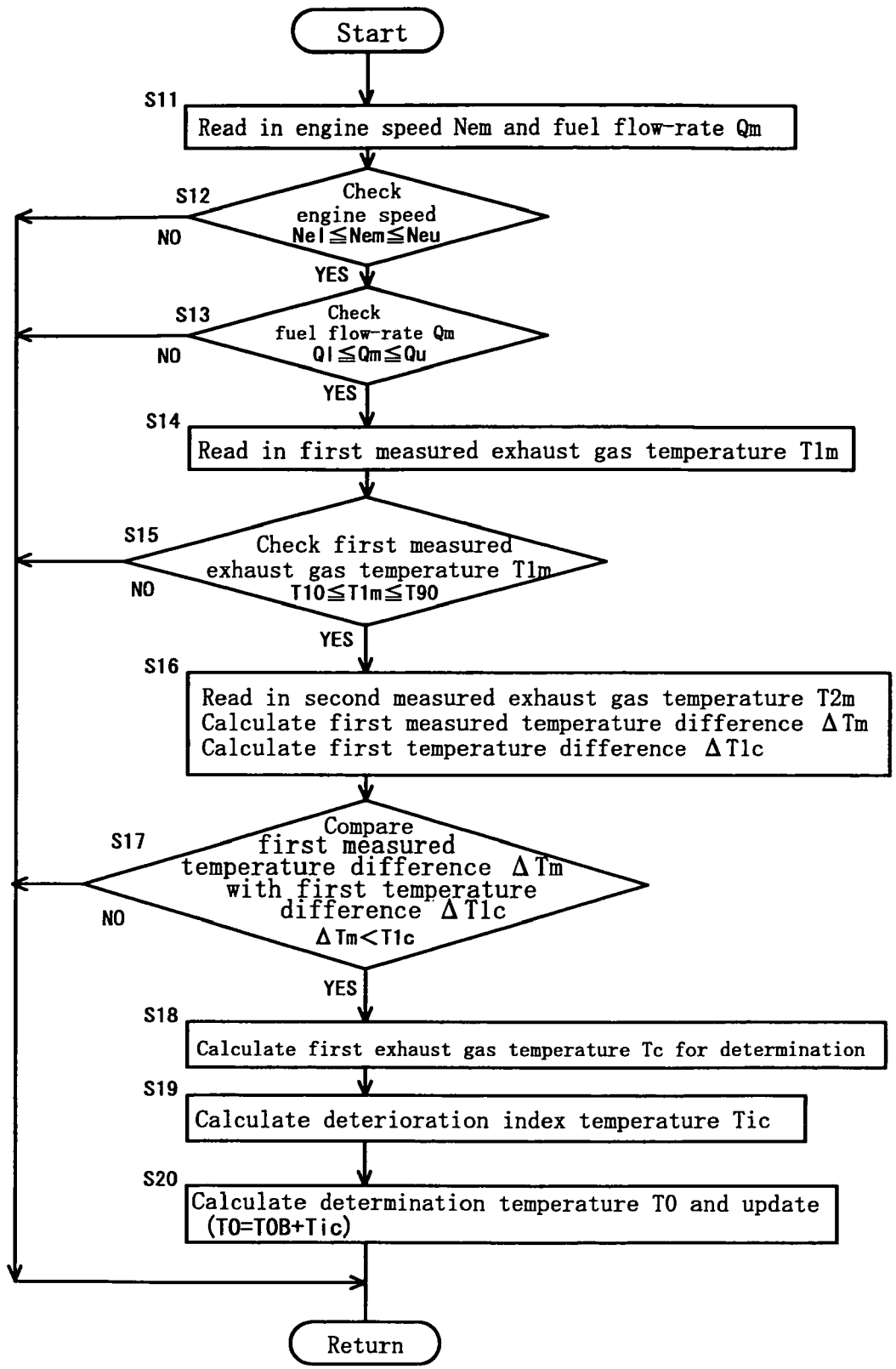
FIG. 2 is a diagram illustrating an example of a control flow of the embodiment of the present invention.

The detection of the deterioration degree of the oxidation catalyst supported by the oxidation catalyst device 12 can be made by a control flow as exemplified in FIG. 2. The control flow in FIG. 2 is a part of a control flow of the exhaust gas purification system 1 executed in parallel with other control flows of the engine E in operation of the engine E. The control flow in FIG. 2 is called up from the main control flow of the exhaust gas purification system 1 when detection of the catalyst deterioration degree and correction of determination temperature T0 are needed, executed and returned, which is executed repeatedly.

The determination of the deterioration degree is preferably executed automatically each time when the operating state (Nem, Qm) of the engine E and the exhaust gas temperature T1m satisfy the conditions at the determination not by intentionally changing the operating state of the internal combustion engine so that the conditions are satisfied.

In the control flow in FIG. 2, when it is started, at Steps S11 to S13, it is determined if the operating state of the engine (internal combustion engine) E is in a predetermined operating state capable of deterioration degree determination or not. At Steps S14 to S15, it is determined if the first measured exhaust gas temperature T1m is within the second temperature range ΔT80 or not. At the next Steps S16 to S17, it is determined if the catalyst is deteriorated or not. Then, at Steps S18 to S19, the deterioration index temperature Tic is calculated and a new determination temperature T0 is calculated at Step S20.

In more detail, at Step S11, the engine speed Nem and the fuel flow-rate Qm corresponding to the load are read in. At Step S12, it is determined if the engine speed Nem is a value within a predetermined set range of engine speed (Nel≦Nem≦Neu) or not, and in the case of No, it is determined that the state is not the predetermined operating state. Also, at Step S13, it is determined if the fuel flow-rate Qm is a value within a set range of fuel flow-rate (Q1≦Qm≦Qu) or not, and in the case of No, it is determined that the state is not the predetermined operating state.

If it is determined in the determination at Steps S11 to S13 that the engine operating state is not the predetermined operating state, the routine returns as it is. On the other hand, when the engine operating state is in the predetermined operating state, the routine goes to Step S14.

At Step S14, the first measured exhaust gas temperature T1$m$ detected by the oxidation-catalyst inlet exhaust-temperature sensor 22 is read in. At Step S15, it is determined if the first measured exhaust gas temperature T1$m$ is within the lower limit value T10 and the upper limit value T90 of the second temperature range ΔT80 (T1$b$≦T1$m$≦T90) or not. In this determination, if the first measured exhaust gas temperature T1$m$ is not within the second temperature range ΔT80, the routine returns as it is. On the other hand, if the first measured exhaust gas temperature T1$m$ is within the second temperature range ΔT80 in this determination, the routine goes to Step S16.

At Step S16, the second measured exhaust gas temperature T2$m$ detected by the oxidation-catalyst outlet exhaust-temperature sensor 23 is read in, and the first measured temperature difference ΔTm (=T2$m$−T1$m$) is calculated by subtracting the first measured exhaust gas temperature T1$m$ from the second exhaust gas temperature T2$m$. Also, based on the deterioration determination data A before deterioration, the first temperature difference ΔT1$c$ corresponding to the first measured exhaust gas temperature T1$m$ is calculated by referring to the map data in FIG. 4.

At the next Step S17, the first measured temperature difference ΔTm is compared with the first temperature difference ΔT1$c$ and if the first measured temperature difference ΔTm is larger than the first temperature difference ΔT1$c$, it is determined that deterioration has not occurred, and the routine returns as it is. On the other hand, if the first measured temperature difference ΔTm is smaller than the first temperature difference ΔT1$c$, it is determined as deterioration and the routine goes to Step S18.

At Step S18, based on the deterioration determination data A before deterioration, the first exhaust gas temperature Tc for determination to become the first temperature difference ΔTc for determination, which is the same as the first measured temperature difference ΔTm, is calculated by referring to the map data in FIG. 4. At the next Step S19, the deterioration index temperature Tic (=T1$m$−Tc) is calculated by subtracting the first exhaust gas temperature Tc for determination from the first measured exhaust gas temperature T1$m$.

That is, as shown in FIG. 3, a Pa point (T1$m$, ΔTm) is acquired from the measurement result of the exhaust gas temperature. From the Pa point, a Pb point (Tc, ΔTc) on the deterioration determination data A is acquired by referring to the map data. The temperature difference (T1$m$−Tc) between the Pa point and the Pb point is the deterioration index temperature Tic.

Then, at Step S20, the determination temperature T0 is calculated by adding the deterioration index temperature Tic obtained at Step S19 to the reference determination temperature T0$b$ set with that before deterioration as a reference. This new determination temperature T0 is used for the temperature for determination in which the activation characteristics (light-off characteristic) of the catalyst matters such as in the temperature-raising control or temperature-lowing control of the exhaust gas after that. For example, the determination temperature T0 is used at control of temperature raising or temperature lowing of the exhaust gas flowing into the oxidation catalyst device 12 in order to activate the oxidation catalyst of the oxidation catalyst device 12.

According to the control based on the control flow in FIG. 2, as shown in FIG. 3, by calculating the first exhaust gas temperature Tc for determination at which the first temperature difference ΔTc for determination based on the deterioration determination data A becomes equal to the first measured temperature difference ΔTm, and a result obtained by subtracting this calculated first exhaust gas temperature Tc for determination from the first measured exhaust gas temperature Tm at the determination can be made as the deterioration index temperature Tic. By this deterioration index temperature Tic, the deterioration degree of the catalyst indicating that HC activity or light-off is deteriorated and the temperature is shifted to the high-temperature side can be continuously detected or determined with accuracy.

And by adding the deterioration index temperature Tic to the reference determination temperature T0$b$ set with that before deterioration as a reference to have the determination temperature T0 of the exhaust gas temperature and using it for control to raise temperature of the exhaust gas, the deterioration degree of the catalyst can be reflected in the temperature-raising control without complicating the algorithm of the temperature-raising control. Therefore, deterioration of fuel cost in the exhaust gas temperature-raising control after deterioration of the catalyst and discharge (slip) of HC, CO to the downstream side of the exhaust gas purification device can be restricted.

In the above explanation, the exhaust gas purification system 1 in which the oxidation catalyst device 12 on the upstream side and the filter device (DPF device) 11 with catalyst on the downstream side are combined is used. However, the present invention can be applied to an exhaust gas purification system in which the oxidation catalyst device on the upstream side and the NOx occlusion/reduction catalyst on the downstream side are combined, an exhaust gas purification system in which the oxidation catalyst device on the upstream side and the SCR catalyst on the downstream side are combined, an exhaust gas purification system with a single NOx occlusion/reduction catalyst, a single SCR catalyst or a single filter device (DPF device) with catalyst, respectively, and an exhaust gas purification system in which an oxidation catalyst, an NOx purification catalyst, and a DPF device are combined.

Also, the determination temperature T0 of the exhaust gas temperature can be used as a determination temperature of an exhaust gas temperature not only in the PM regenerative control exemplified above but also in the NOx regenerative control of the NOx occlusion/reduction catalyst or NO x purification catalyst in the NOx direct reduction catalyst, and desulphurization control for restoring from sulfur poisoning of various catalysts such as the oxidation catalyst, NOx occlusion/reduction catalyst, NOx direct reduction catalyst, and SCR catalyst.

The method for control of exhaust gas purification system and the exhaust gas purification system of the present invention having the above-mentioned excellent advantages can be effectively used for an exhaust gas purification system or the like for purifying an exhaust gas of an internal combustion engine mounted on an automobile.

What is claimed is:
1. A method for control of an exhaust gas purification system provided with a catalyst device supporting a catalyst for purifying an exhaust gas in an internal combustion engine in which a deterioration degree of said catalyst is detected and exhaust-gas temperature raising control is executed according to a change in purification characteristics by the deterioration degree, comprising:

storing in advance as deterioration determination data (A), a relation between a first exhaust gas temperature for determination (Tent), which is a temperature of the exhaust gas flowing into said catalyst and a first temperature difference for determination (ΔT) as a difference between a second exhaust gas temperature for determination (Tout), which is a temperature of the exhaust gas flowing out of said catalyst, and said first exhaust gas temperature for determination (Tent) before deterioration;

determining the deterioration degree, when an operating state of the internal combustion engine is in a predetermined operating state and a first measured exhaust gas temperature (T1m), which is a temperature of the exhaust gas flowing into said catalyst during the operating state, is within a second temperature range (ΔT80) whose vertical width is narrower by 10% each than a first temperature range (TΔ100) between an activation start temperature (Ta) and an activation end temperature (Tb) before deterioration of said catalyst;

calculating a first temperature difference (ΔT1c) corresponding to the first measured exhaust gas temperature (T1m) based on the deterioration determination data (A), calculating a first measured temperature difference (ΔTm) by subtracting the first measured exhaust gas temperature (T1m) from a second measured exhaust gas temperature (T2m), which is a temperature of the exhaust gas flowing out of said catalyst during the operating state, comparing the first measured temperature difference (ΔTm) with the first temperature difference (ΔT1c) and, if the first measured temperature difference (ΔTm) is equal or larger than the first temperature difference (ΔT1c), determining that deterioration has not occurred, and if the first measured temperature difference (ΔTm) is smaller than the first temperature difference (ΔT1c), determining that deterioration has occurred;

when it is determined that deterioration has occurred, making the determination on the deterioration degree by calculating a first exhaust gas temperature for determination (Tc) at which said first temperature difference for determination (ΔTc) based on the deterioration determination data (A) becomes equal to the first measured temperature difference (ΔTm) corresponding to said first measured exhaust gas temperature (T1m) at determination based on said deterioration determination data (A), and by subtracting the calculated first exhaust gas temperature for determination (Tc) from said first measured exhaust gas temperature (T1m) at determination to result in a deterioration index temperature (Tic); and using, when a control to raise or lower the temperature of the exhaust gas flowing into said catalyst is executed in order to activate said catalyst, a temperature obtained by adding said deterioration index temperature (Tic) obtained at said determination of the deterioration degree to a reference determination temperature (T0b) set with that before deterioration as a reference, as a determination temperature of the exhaust gas temperature (T0) in the control to raise or lower the temperature of said exhaust gas.

2. An exhaust gas purification system provided with a catalyst device supporting a catalyst for purifying an exhaust gas in an internal combustion engine and control means which detects a deterioration degree of said catalyst and controls exhaust gas temperature rise according to a change in the purification characteristics by the deterioration degree, comprising:

said control means stores a relation between a first exhaust gas temperature for determination (Tent), which is a temperature of the exhaust gas flowing into said catalyst and a first temperature difference for determination (ΔT) as a difference between a second exhaust gas temperature for determination (Tout), which is a temperature of the exhaust gas flowing out of said catalyst during the operating state, and said first exhaust gas temperature for determination (Tent) before deterioration as deterioration determination data (A) in advance;

when an operating state of the internal combustion engine is in a predetermined operating state and a first measured exhaust gas temperature (T1m), which is a temperature of the exhaust gas flowing into said catalyst during the operating state, is within a second temperature range (TΔ80) whose vertical width is narrower by 10% each than a first temperature range (TΔ100) between an activation start temperature (Ta) and an activation end temperature (Tb) before deterioration of said catalyst, the deterioration degree is determined;

a first temperature difference (ΔT1c) corresponding to the first measured exhaust gas temperature (T1m) is calculated based on the deterioration determination data (A), a first measured temperature difference (ΔTm) is calculated by subtracting the first measured exhaust gas temperature (T1m) from a second measured exhaust gas temperature (T2m), which is a temperature of the exhaust gas flowing out of said catalyst during the operating state, the first measured temperature difference (ΔTm) is compared with the first temperature difference (ΔT1c) and, if the first measured temperature difference (ΔTm) is equal to or larger than the first temperature difference (ΔT1c), it is determined that deterioration has not occurred, and if the first measured temperature difference (ΔTm) is smaller than the first temperature difference (ΔT1c), it is determined that deterioration has occurred;

when it is determined that deterioration has occurred, the determination on the deterioration degree is made by calculating a first exhaust gas temperature for determination (Tc) at which said first temperature difference for determination (ΔTc) based on the deterioration determination data (A) becomes equal to the first measured temperature difference (ΔTm) corresponding to said first measured exhaust gas temperature (T1m) at determination based on said deterioration determination data (A), and the calculated first exhaust gas temperature for determination (Tc) is subtracted from said first measured exhaust gas temperature (T1m) at determination to result in a deterioration index temperature (T1c); and when a control to raise or lower the temperature of the exhaust gas flowing into the catalyst is executed in order to activate said catalyst, a temperature obtained by adding said deterioration index temperature (T1c) obtained at said determination of the deterioration degree to a reference determination temperature (T0b) set with that before deterioration as a reference is used as a determination temperature of the exhaust gas temperature (T0) in the control to raise or lower the temperature of said exhaust gas.

* * * * *